Jan. 26, 1965    K. O. R. GEBHARD ETAL    3,166,841
DESCALING

Filed Nov. 13, 1961    2 Sheets-Sheet 2

INVENTORS
KURT OTTO REINHOLD GEBHARD
THOMAS BARRY BEETON
BY Irwin S. Thompson
ATTY.

United States Patent Office 3,166,841
Patented Jan. 26, 1965

3,166,841
DESCALING
Kurt Otto Reinhold Gebhard and Thomas Barry Beeton,
Pretoria, Transvaal, Republic of South Africa, assignors
to South African Iron and Steel Industrial Corporation,
Limited, Pretoria, Transvaal, Republic of South Africa,
a corporation of the Republic of South Africa
Filed Nov. 13, 1961, Ser. No. 151,971
Claims priority, application Republic of South Africa,
Nov. 24, 1960, 60/4,778
11 Claims. (Cl. 29—529)

This invention relates to descaling of iron and steel products.

It is often necessary to remove the scale which forms on hot rolled iron and steel products, particularly when further processing by cold reduction is required. This applies to flat products as well as to rods and bars. Descaling is frequently required with castings as well. As is well known, the composition of scale depends to a large extent on the cooling rate and other operational conditions, but the scale produced in modern rolling mills consists mainly of magnetite ($Fe_3O_4$).

The most common method of descaling is pickling in a sulphuric acid solution, but this method as carried out hitherto suffers from certain well known disadvantages, such as, for example, the effluent problem.

It is an object of the present invention to provide a simple, economical and rapid method of descaling.

According to the invention, a method of removing magnetite scale from an iron or steel product includes the steps of converting at least a major portion of the magnetite to wustite by heating under inert conditions in a gaseous atmosphere; and removing the wustite scale.

For the purpose of this specification, "magnetite scale" is intended to signify a scale containing an appreciable amount of magnetite ($Fe_3O_4$).

The gaseous atmosphere preferably comprises carbon dioxide and/or nitrogen and/or argon.

The magnetite may be converted in a gaseous atmosphere at any suitable temperature above about 580° C. The temperature may exceed 1000° C.

The converted wustite scale is preferably cooled or allowed to cool down to below the minimum conversion temperature before it is removed, the wustite scale being maintained under inert conditions until the minimum conversion temperature is reached.

The conversion may be combined with a heat treatment operation to be performed on the product.

The removal of the wustite scale may be achieved by pickling in any conventional manner.

Alternatively or additionally, removal of the wustite scale may be achieved by mechanical action.

For a clearer understanding of the invention, specific embodiments will now be described by way of example with reference to the accompanying illustrations in which.

In order to descale an iron or steel product covered with magnetite scale, the product is placed preferably in a carbon dioxide atmosphere in a suitable furnace, the temperature of the furnace being sufficiently high to convert the magnetite to wustite. The product is kept heated in the carbon dioxide atmosphere for a sufficient period of time to convert substantially all, or at least a major portion of the magnetite to wustite. The carbon dioxide atmosphere maintains the product under inert conditions. After conversion, the product is cooled and the wustite scale removed in any suitable manner as will hereinafter be described in greater detail.

According to S. Garber of the British Iron and Steel Research Association in "Nature," vol. 183 (1959), page 1387, wustite is normally given for practical and historical reasons as stoichiometric FeO whereas in fact it is more accurately described as $Fe_{1-y}O$ where Y is the concentration of vacancies on iron lattice sites.

For the sake of simplicity, wustite will be indicated as FeO in the reactions given below.

Without wishing to limit the invention by any hypothetical considerations, it is assumed that the conversion of the magnetite in accordance with the invention possibly proceeds as follows:

At the conversion temperatures, the magnetite is converted according to the following reaction:

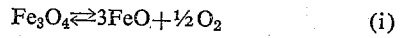

$$Fe_3O_4 \rightleftarrows 3FeO + \tfrac{1}{2}O_2 \qquad (i)$$

However, when free iron is present, the oxygen liberated according to reaction (i) combines in the inert atmosphere with the free Fe according to the following reaction:

$$Fe + \tfrac{1}{2}O_2 \rightarrow FeO \qquad (ii)$$

Therefore, the overall reaction when iron is present would appear to be

$$Fe_3O_4 + Fe \rightarrow 4FeO \qquad (iii)$$

The minimum conversion temperatures of magnetite to wustite and vice versa are variously given in the literature as being about 580° C., 600° C. and 620° C. These differences may possibly be in part attributed to differences in the composition of the material considered. An average temperature may be about 600° C.

The temperature at which conversion takes place must, therefore, be above about 580° C., and preferably above 600° C. The time necessary for the completion of the scale conversion depends on the temperature at which the conversion takes place. Where the scale is heated from an external source, it might be advantageous to operate at a temperature in excess of 1000° C., since conversion can be effected with a minimum temperature rise in the parent metal.

Figure 1:
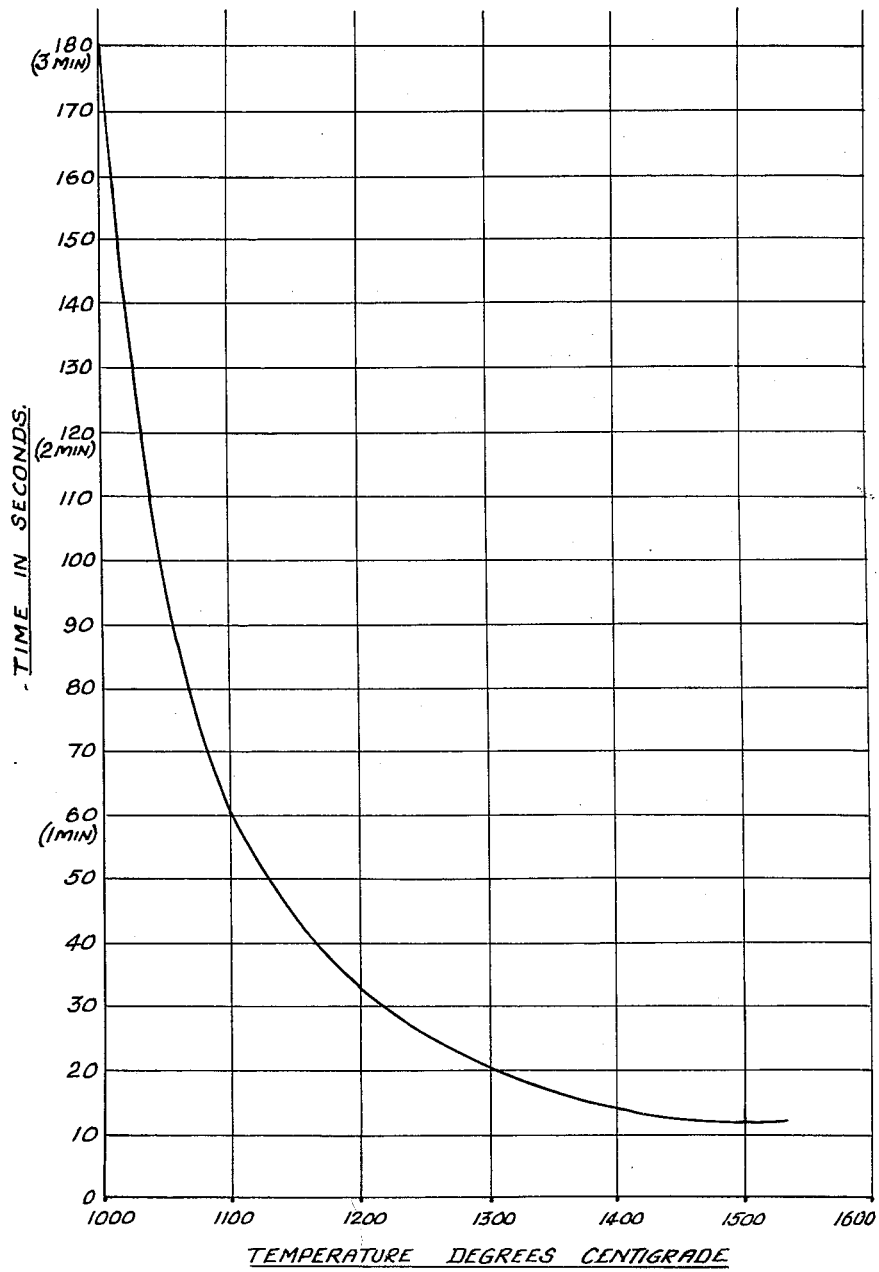
FIGURE 1 is a graph in which the time in seconds required for the conversion of the magnetite scale on a sample of hot rolled strip in an atmosphere of carbon dioxide, is plotted against the wall temperature of a furnace containing the atmosphere. The temperature was observed with an optical pyrometer.

FIGURE 1 gives an indication of the conversion time in the temperature range 1000° C. to 1600° C. for a sample of hot rolled strip. It will be seen from the graph that at 1000° C., three minutes are required for conversion, whereas only 12 seconds are required at 1500° C.

It was found with another sample of 16 gauge hot rolled strip that the scale conversion time was 15 seconds at a furnace temperature of 1600° C., 25 seconds at a furnace temperature of 1500° C., and 55 seconds at a furnace temperature of 1200° C. The temperature of the parent metal after such treatment was of the order of 400° C. and the energy consumption relatively low. The temperature of the sample strip was determined calorimetrically After conversion of magnetite scale to wustite, it is preferred to cool the product or allow it to cool down before the wustite scale is removed. It will be appreciated that the converted wustite should not be exposed to atmospheric oxygen until it has cooled to below the minimum conversion temperature at which the wustite is unstable and will be re-converted to magnetite upon exposure to oxygen. The minimum conversion temperature is about 580° C.

The wustite scale must, therefore, be maintained under inert conditions until stability is reached. This may be done by passing the product from the furnace after conversion is completed, into an adjacent low temperature cooling chamber containing carbon dioxide. The carbon dioxide may be circulated from the cooling chamber into the furnace, with the product under treatment moving counter to the flow of carbon dioxide.

The rate of cooling to which the scale is subjected is not critical. The only proviso is that the wustite scale must be below about 580° C. before it is exposed to atmospheric air.

It will be appreciated that any suitable arrangement may be used for batch or continuous treatment of material. The provision of the necessary equipment lies within the capabilities of a man skilled in the art.

Where high temperature operation is preferred, the heating furnace should convey an intense surface heat to the product under treatment in order to convert the scale in the minimum amount of time and thus minimize heating of the parent metal. Thus any type of radiant heat furnace can be used, such as, for example, "glo-bar" furnaces or "image" furnaces. The carbon dioxide atmosphere in the furnace and any cooling chamber should be maintained at a positive pressure to prevent the ingress of air into the furnace and the chamber.

Scale conversion according to the invention may also be carried out in conjunction with a heat treatment operation, such as annealing, which is performed on the product. Annealing processes are often carried out at temperatures in the order of 600° C. to 1000° C. It is, for example, necessary for hot rolled wire rod to be annealed before drawing and scale conversion can be effected simultaneously with annealing by purging oxygen-free carbon dioxide into the annealing containers. The wustite scale which is formed is subsequently removed from the annealed product.

Figure 2:
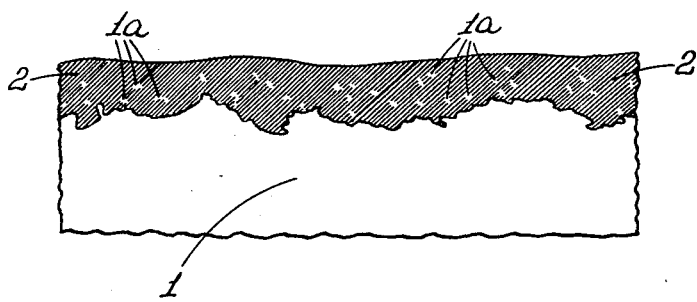
FIGURE 2 is a representation of a section of the magnetite scale layer and the parent metal of a sample of hot rolled strip before conversion treatment.
Figure 3:
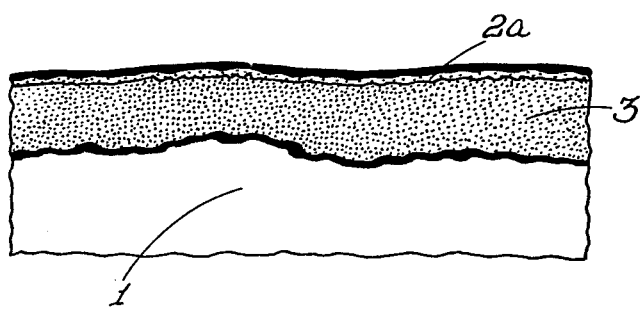
FIGURE 3 is a representation of a section of the strip after conversion treatment in an inert atmosphere of carbon dioxide.

FIGURES 2 and 3 show the effect of the scale conversion clearly. FIGURE 2 shows the structure prior to conversion treatment. The parent metal 1 carries the magnetite scale layer 2. The white dots 1a are inclusions of free iron embedded in the magnetite. During conversion, these iron inclusions probably take part in a reaction according to reaction (iii) above.

There is a strong bond between the parent metal and the scale layer due to the irregular contact zone between the parent metal and the scale layer.

FIGURE 3 shows the structure after a conversion treatment. The converted scale on the parent metal 1 consists mainly of the wustite layer 3, whilst only a thin layer of magnetite 2a exists on the outside. The iron inclusions 1a of figure 2 have disappeared.

The irregularities in the contact zone between the parent metal and the converted scale layer have been smoothed out and the adherence of the converted scale to the parent metal is greatly decreased as compared with that of the untreated scale.

The converted wustite scale may be removed in any suitable manner, such as by pickling in acid and/or by mechanical action. It has been found that the rate of reaction of sulphuric acid with wustite is considerably faster than with magnetite. A flash pickling operation of relatively short duration would normally be sufficient to remove the wustite.

The wustite scale is very brittle and therefore easily removable by mechanical action. The wustite scale has been found to flake off in big patches when mechanical stresses are applied to the parent metal. The metal surface thus exposed is bright and shiny and does not possess the dull appearance of pickled material. Even after a cold reduction of 60%, the surface of a sample strip descaled by first converting the scale and then removing it by bending, was brighter than the surface of a strip that had been descaled by pickling.

For complete removal of the converted scale, the product may first be passed through a bending machine to break the scale, and then pickled in 10% sulphuric acid.

Instead of a final pickling operation, the converted scale may be subjected to sand blasting or wire brushing after the bending operation. It is, of course, also possible to remove the scale by sand blasting or wire brushing only.

It will be appreciated that many variations in detail are possible without departing from the spirit of the invention. For example, instead of a carbon dioxide atmosphere, nitrogen, argon or any other suitable gas free, or substantially free from oxygen may be used to provide an inert atmosphere. It was found during tests that the best results were obtained by using carbon dioxide.

Instead of heating the product within a furnace, any other suitable heating arrangement may be used, such as inductive heating.

It is to be understood that the present invention includes within its scope, an iron or steel product which has been descaled by the method as described herein.

The method according to the invention has been found to be quick and economical. Relatively simple equipment is required to maintain a gaseous atmosphere inside a furnace or other heating means, and good heat transfer occurs from the walls of a furnace or the like.

What we claim is:

1. A method of removing magnetite scale from an iron or steel product, including the steps of converting at least a major portion of the magnetite to wustite by heating under inert conditions in a gaseous atmosphere; and removing the wustite scale.

2. A method according to claim 1, in which the gaseous atmosphere comprises carbon dioxide.

3. A method according to claim 1, in which the gaseous atmosphere comprises nitrogen.

4. A method according to claim 1, in which the gaseous atmosphere comprises argon.

5. A method according to claim 1, in which the magnetite is converted in a gaseous atmosphere at a temperature above about 580° C.

6. A method according to claim 1, in which the converted wustite scale cools down to below the minimum conversion temperature before it is removed, the wustite scale being maintained under inert conditions until the minimum conversion temperature is reached.

7. A method according to claim 1, in which the conversion takes place in combination with a heat treatment operation performed on the product.

8. A method according to claim 1, including the removal of the wustite scale by pickling.

9. A method according to claim 1, including the removal of the wustite scale by mechanical action.

10. A method according to claim 5, in which the temperature exceeds 1000° C.

11. A method of removing magnetite scale from an iron or steel product, including the steps of converting at least a major portion of the magnetite to wustite by heating under inert conditions in a gaseous atmosphere comprising carbon dioxide at a temperature above about 580° C., cooling the converted wustite scale down below the minimum conversion temperature while under inert conditions until said minimum conversion temperature is reached, and removing the wustite scale by mechanical action.

References Cited by the Examiner

UNITED STATES PATENTS 2,931,636  4/60  Engelhard _____ 148—16.7 X
2,937,431  5/60  Bongiovanni _____ 29—81

OTHER REFERENCES

The Design and Use of Special Atmospheres for Industrial Furnaces, Continental Industrial Engr., Inc., June 21, 1939, pp. 4 and 5.

WHITMORE A. WILTZ, *Primary Examiner.*

HYLAND BIZOT, *Examiner.*